(12) United States Patent
Holmes

(10) Patent No.: US 6,490,445 B1
(45) Date of Patent: Dec. 3, 2002

(54) CUSTOMER ACTIVATION SYSTEM FOR CELLULAR NETWORK

(75) Inventor: David William James Holmes, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/619,108

(22) Filed: Jul. 19, 2000

Related U.S. Application Data

(63) Continuation of application No. 08/568,041, filed on Dec. 6, 1995, now abandoned.

(51) Int. Cl.[7] .......................... H04M 3/00; H04M 1/00; H04M 1/66; H04M 1/68
(52) U.S. Cl. ...................... 455/419; 455/418; 455/551; 455/411
(58) Field of Search ................................. 455/419, 418, 455/551, 550, 403, 410, 411, 422, 426, 517

(56) References Cited

U.S. PATENT DOCUMENTS

| 4,593,155 A | 6/1986 | Hawkins |
| 4,817,190 A | 3/1989 | Comroe et al. |

(List continued on next page.)

FOREIGN PATENT DOCUMENTS

| CA | 2177272 | 6/1995 |
| CA | 2182598 | 8/1995 |
| EP | 0 630 167 A2 | 12/1994 |
| EP | 0 778 716 A2 | 6/1997 |
| WO | WO 95/15065 | 6/1995 |
| WO | WO 95/23487 | 8/1995 |
| WO | 96 27270 | 9/1996 |

OTHER PUBLICATIONS

Carden, Jim, "Digital Opens the Door to Over-the-Air Activation," Cellular Business, Jan. 1994, p. 50,52, vol. 11, No. 1, USA.

Levenson, Sam & Wong, Karen, "Rapid Service Activation for Personal Communications Access Services," IEEE Conference Proceedings, 1994, p. 1–5, USA.

Holmes, David, "Outline Service Description for On–Air Programming," Telecomms. Insdustry Association TDMA Digital Cellular Systems Sub–committee; Alberta Canada, Jan. 24, 1994.

*Primary Examiner*—Tracy Legree
(74) *Attorney, Agent, or Firm*—Perkins Coie LLP

(57) ABSTRACT

A mobile communication terminal device such as a cellular telephone is provided with a preliminary identifier stored in memory. The identifier allows access to a cellular network for verification and provides essentially unique identification by the network, but is insufficient to allow further use of the network. During verification, the identifier is analyzed by a cellular network processor and a determination is made whether the cellular telephone should have restricted access to the network. Upon favorable completion of the identifier analysis, a signal may be transmitted to the cellular telephone that allows the cellular telephone to have less restricted access to the network.

10 Claims, 2 Drawing Sheets

U.S. PATENT DOCUMENTS

| | | | | |
|---|---|---|---|---|
| 4,864,599 | A | 9/1989 | Saegusa | |
| 4,910,510 | A | 3/1990 | Davis et al. | |
| 4,951,308 | A | 8/1990 | Bishop et al. | |
| 4,958,368 | A | 9/1990 | Parker | |
| 4,965,821 | A | 10/1990 | Bishop et al. | |
| 4,977,592 | A | 12/1990 | Hollowed et al. | |
| 5,020,091 | A | 5/1991 | Krolopp et al. | |
| 5,046,082 | A | 9/1991 | Zicker et al. | |
| 5,077,790 | A | 12/1991 | DAmico | |
| 5,109,403 | A | 4/1992 | Sutphin | |
| 5,155,860 | A | 10/1992 | McClure | |
| 5,179,373 | A | 1/1993 | John | |
| 5,197,092 | A | 3/1993 | Bamburak | |
| 5,212,809 | A | 5/1993 | Oka | |
| 5,297,191 | A | 3/1994 | Gerszberg | |
| 5,297,192 | A | 3/1994 | Gerszberg | |
| 5,301,223 | A | 4/1994 | Amadon | |
| 5,315,638 | A | 5/1994 | Mukari | |
| 5,335,278 | A | 8/1994 | Matchett et al. | |
| 5,381,138 | A | 1/1995 | Stair et al. | |
| 5,386,455 | A | 1/1995 | Cooper | |
| 5,423,079 | A | 6/1995 | Namiki et al. | |
| 5,465,288 | A | * 11/1995 | Falvey et al. | 455/419 |
| 5,485,505 | A | * 1/1996 | Norman et al. | 455/419 |
| 5,499,295 | A | * 3/1996 | Cooper | 380/270 |
| 5,507,009 | A | 4/1996 | Grube et al. | |
| 5,524,135 | A | * 6/1996 | Mizikovsky et al. | 455/419 |
| 5,524,276 | A | * 6/1996 | Littig et al. | 455/419 |
| 5,544,225 | A | 8/1996 | Kennedy, III et al. | |
| 5,577,100 | A | * 11/1996 | McGregor et al. | 455/418 |
| 5,603,084 | A | * 2/1997 | Henry, Jr. et al. | 455/419 |
| 5,619,562 | A | * 4/1997 | Maurer et al. | 379/201 |
| 5,625,669 | A | * 4/1997 | McGregor et al. | 455/419 |
| 5,722,084 | A | * 2/1998 | Chakrin et al. | 455/419 X |
| 5,754,954 | A | * 5/1998 | Cannon et al. | 455/419 |
| 5,794,141 | A | * 8/1998 | Zicker | 455/419 |
| 5,812,953 | A | * 9/1998 | Griffith et al. | 455/550 |
| 5,878,339 | A | * 3/1999 | Zicker et al. | 455/419 |
| 6,064,879 | A | * 5/2000 | Fujiwara et al. | 455/419 |
| 6,188,899 | B1 | 2/2001 | Chatterjee et al. | |

* cited by examiner

CUSTOMER ACTIVATION SYSTEM FOR CELLULAR NETWORK

This is a continuation of Ser. No. 08/568,041 filed Dec. 6, 1995, now abandoned.

TECHNICAL FIELD

The present invention relates in general to a data transmission system and a method which can be used to interface a cellular telephone with an activation computer for the programming of a cellular telephone.

BACKGROUND OF THE INVENTION

Cellular telephone use in the United States has dramatically increased over the past few years. When cellular telephones were first introduced, they were mainly large, vehicle-installed units sold through specialty dealers and small shops specializing in the installation and activation of cellular telephones. In recent years, however, compact portable units have become commonplace and cellular service providers and other mass retailers have replaced the specialty dealers and installers as the preferred source of supply. Because these compact portable units are being sold in areas serviced by local carriers having different and sometimes conflicting activation requirements, they are typically received at the retailer's store without the information necessary for their activation. The information needed for activation is generally programmed, after purchase and authorization by the telephone carrier, into the cellular telephone in order to activate it. Typically, this information includes a telephone number or Mobile Station Identification (MSID) that is installed in the memory of the cellular telephone by the mass retailer. In most domestic systems, the MSID complies with a format designated as the MIN standard, which standard is defined in IS-136, EIA-553, and so on. In other systems, the MSID may be, for example, the international mobile station identification (IMSI) format as defined in ITU recommendation E.212. In any event, the local carrier also includes-some information from the cellular telephone unit itself that identifies the particular cellular unit to the local carrier's equipment in order to effect the right service (protocol selection specific to the manufacturer of the cellular unit) and correct billing (call cost accounting).

Some cellular service providers have required that any prospective customer bring the cellular telephone unit, after purchasing it, to an authorized service center for activation. Because such a procedure is cumbersome and costly to the consumer, as well as to the provider (due to a delay in the service commencement date), other service providers have developed techniques for activating the telephone unit at the point of sale. Since mass retailers concentrate on selling the consumer a cellular telephone and, because the time of their sales personnel is most profitably spent on making as many sales to as many consumers as possible, the retailers prefer to minimize the time associated with activating each cellular telephone unit after the sale. Disadvantageously, activation of the cellular telephone unit is generally performed manually by the retailer's technician or even sales clerk, with the aid of a manual through the dial key pad of the cellular telephone.

A correct sequence of numbers and codes must be entered in order to program the cellular telephone. A small mistake can cause a failure of service, render the cellular unit inoperable or even damage it. In spite of the need for accuracy and knowledge in performing this activation process, many of the individuals charged with performing this process are either untrained or unfamiliar with the proper process. Currently, a significant percentage of the post-sale activation programming fails, causing the consumer to return to the place of purchase for reprogramming with not only the inconvenience of unit downtime, but the inconvenience of having to return and spend time while the unit is once again programmed.

Recognizing the above mentioned deficiencies, it has been proposed in U.S. Pat. No. 5,297,191 entitled METHOD AND APPARATUS FOR REMOTELY PROGRAMMING A WIRELESS TELEPHONE SET and issued to I. Gerszberg on Mar. 22, 1994, to provide a cellular telephone with a tone signals receiver to permit remote downloading of an assigned MSID into a read-only-memory circuit. This downloading is achieved, in one embodiment, by bridging the receiver onto an unblocked wireless voice communication channel established between the subscriber's set and a service representative, to thereby permit remote entry of subscriber-specific programming and wireless service authorization data into the subscriber's telephone set, as by a service representative or an automated activation computer. While this technique desirably relieves the sales representative of the task of programming the cellular telephone unit, it does involve the provision of a sufficient number of unblocked voice communication channels to accommodate the expected volume of new subscribers.

Accordingly, there exists a need for a method of programming wireless telephone sets in a manner that quickly, reliably, and cost effectively provides telephone service to new or existing customers.

SUMMARY OF THE INVENTION

The foregoing need is met in an illustrative embodiment wherein a process of manufacturing a cellular telephone comprises the steps of assembling a memory, process, a receiver, and a transmitter, and storing in the memory an identifier. Essentially, the identifier allows access to a cellular network for verification and provides essentially unique identification by the network, but is insufficient to allow further use of the network.

A process of verification of a cellular telephone constructed in accordance with the illustrative process comprises the steps of receiving from the wireless telephone set an identifier that is transmitted at least in part on a cellular network and analyzing the transmitted identifier to make a determination that the cellular telephone should have restricted access to the network. The verification process further includes, upon favorable completion of the determining step, a step of transmitting a signal to the cellular telephone, the signal transmitted allowing the cellular telephone to have less restricted access to the network.

The present invention not only greatly reduces the time required for programming or for activation, but it insures a correct exchange of activation programming information by automating the process, thus eliminating programming errors.

BRIEF DESCRIPTION OF THE DRAWINGS

Other features and advantages of the present invention will be better understood by reference to the following detailed description and to the drawings, in which.

DETAILED DESCRIPTION

Figure 1:
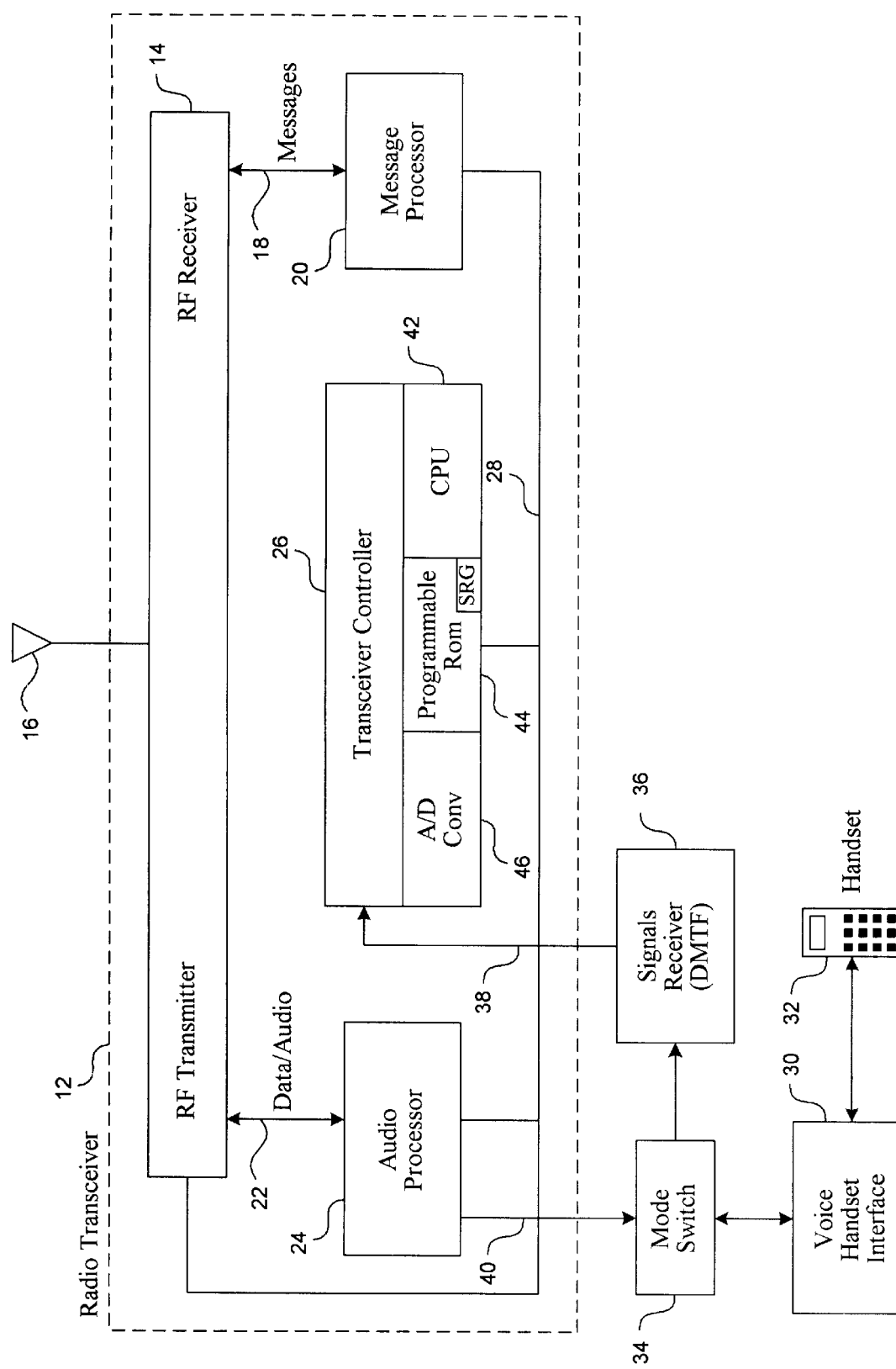
FIG. 1 is a block diagram schematically illustrating a mobile communications terminal device such, for example, as a cellular telephone, programmed with a preliminary identifier and other information needed to obtain restricted access to a cellular network in accordance with the present invention.

Referring to FIG. 1, there is shown, in functional block diagram form, a mobile communication terminal device which, for purposes of illustrative example only, is configured as a portable cellular telephone unit 10 with provisions for remote programming over a voice channel of a cellular telephone network. One such telephone unit is described in U.S. Pat. No. 5,297,191, the disclosure of which is expressly incorporated herein by reference.

As seen in FIG. 1, the cellular telephone unit 10., in one embodiment, comprises a radio transceiver portion 12 which includes a radio frequency receiver/transmitter 14 coupled to an antenna 16 and adapted to receive and transmit signals from and to a base station, e.g. a mobile cell site, or another wireless telephone. Coupled to the receiver/transmitter 14, via, for example, a bi-directional message connecting lead 18, is a processor 20 capable of receiving and processing system message-type signals. Also coupled to the receiver/transmitter 14, via, for example, another bi-directional lead 22, is a processor 24 adapted to process data signals as well as audio signals originating or received at the wireless telephone 10. Audio and data signals present on lead 22 are those signals intended for and derived from the antenna 16. Although two individual processors 20 and 24 are shown and described in FIG. 1, it will be readily appreciated by those skilled in the art that a single processor may be configured to perform both sets of functions and that the illustrated configuration is presented for purposes of example only.

Within the radio transceiver 12, a controller 26 is coupled to the message processor 20 and the audio processor 24, via a control bus 28, which is also coupled to the receiver/transmitter 14. A voice handset interface circuit 30 interconnects the audio processor 24 and a telephone handset 32. In accordance with one illustrative embodiment, interposed between the voice handset interface 30 and the radio transceiver 12 is a mode switch 34, which in turn is coupled to a signals receiver 36. The latter is coupled via lead 38, to the transceiver controller 26. As will be explained in more detail later, the mode switch 34 diverts signals received at the antenna 16 and present on output lead 40 of the audio processor 24 to the signals receiver 36 during remote programming.

Signals receiver 36 may be selected among known commercially available receivers, such as, for example, the Hitachi HD404678 4-bit microprocessor with an integral DTMF receiver. In the case where the programming signals out of the audio processor 24 and present on lead 40 are in digital form, other similar expedients are employed. For example, the signals receiver 36 couples such digital signals to the controller 26 wherein an internal controller processing unit 42 directs such digital information for storage in a memory circuit within the controller 26, such, for example, as permanent read-only memory 44. Alternatively, if the programming information received at the antenna 16 is in the form of a sequence of tone signals, the receiver 36 (which in such case would be a tone signals receiver) would connect such signals to an analog-to-digital converter 46 such as that located within the controller 26. The digital output signals generated by the converter 46 would next be stored in the memory circuit 44 under the control of the processing unit 42.

Essentially all cellular telephone units shipped by a manufacturer contain, in memory as programmable memory circuit 44, identical test data, along with a serial number (hereinafter, referred to as ESN) unique to each respective unit. If desired, an external I/O connector to the I/O interface (not shown) of CPU 42 may be provided to facilitate individual programming of each terminal device. In this regard, however, it will be readily appreciated by those skilled in the art that the external I/O connector may be omitted if all factory programming of EEPROM 44 is to be performed prior to installation. In any event, CPU 42 is configured to receive and analyze ESN data and other test data fed to its I/O interface during initial factory programming, and thereafter to write the same in the storage region SRG of EEPROM 44.

As noted above, in conventional practice a mobile communication terminal device such as a cellular telephone unit 10 would typically be shipped from the factory to the retailer's store without all of the information needed for access to a cellular network. Before the new unit can fully interact with a selected provider's network, sufficient information must be presented to the network to facilitate identification, authentication, and billing. In accordance with the present invention, the newly purchased cellular telephone unit or other mobile communication terminal device 10 is programmed with sufficient information to provide, at least initially, restricted access to such a network. Advantageously, this information may be programmed at the factory in an automated manner, making the resources of the mass retailer available for more productive use.

As noted above, essentially all cellular telephones shipped by a manufacturer contain, in memory, the same test data. This test data, which includes any activation information needed to obtain or simulate access to a cellular network during a trial operation at the factory, is eventually overwritten upon actual activation. It will therefore be readily apparent to those skilled in the art that all such telephones, if not programmed, will appear identical to the network upon their initial activation. As a result, an attempt is to activate one such phone while another is being powered-up in the same vicinity may cause substantial difficulties during an on-air attempt to appropriately program either such telephone. In short, the network may either program them both, or be unable to complete such programming due to the apparent redundancy being encountered.

In accordance with the manufacturing process of the present invention, conflicts of the abovementioned type are avoided by inserting, at the factory or other convenient location, a preliminary or provisional identification into the memory of the mobile communications terminal device. Essentially, this preliminary identification is selected so as to provide identification to a particular device that is, in use, unlikely to cause a redundancy. By way of illustrative example, a cellular telephone manufacturer could use a series of 10,000 MSID numbers having, for example, a MIN, IMSI, or other format which may be used presently or adopted later, for insertion into the phones during manufacturing and repeat the sequence upon exhaustion. The resulting probability that two telephones resident in the same geographic area would have the same such identification (due to the repeated use of the same series of 10,000 numbers), is extremely small. Therefore, by use of a limiting identification number inserted into the phone upon manufacturing, previously unrecognized difficulties associated with on-air programming are obviated. By way of further illustrative example, the cellular telephone manufacturer may assign the aforementioned PMSID in a completely random manner. As in the previous example, the probability of two telephones becoming resident in the same geographic area and having the same such identification would be remote.

Figure 2:
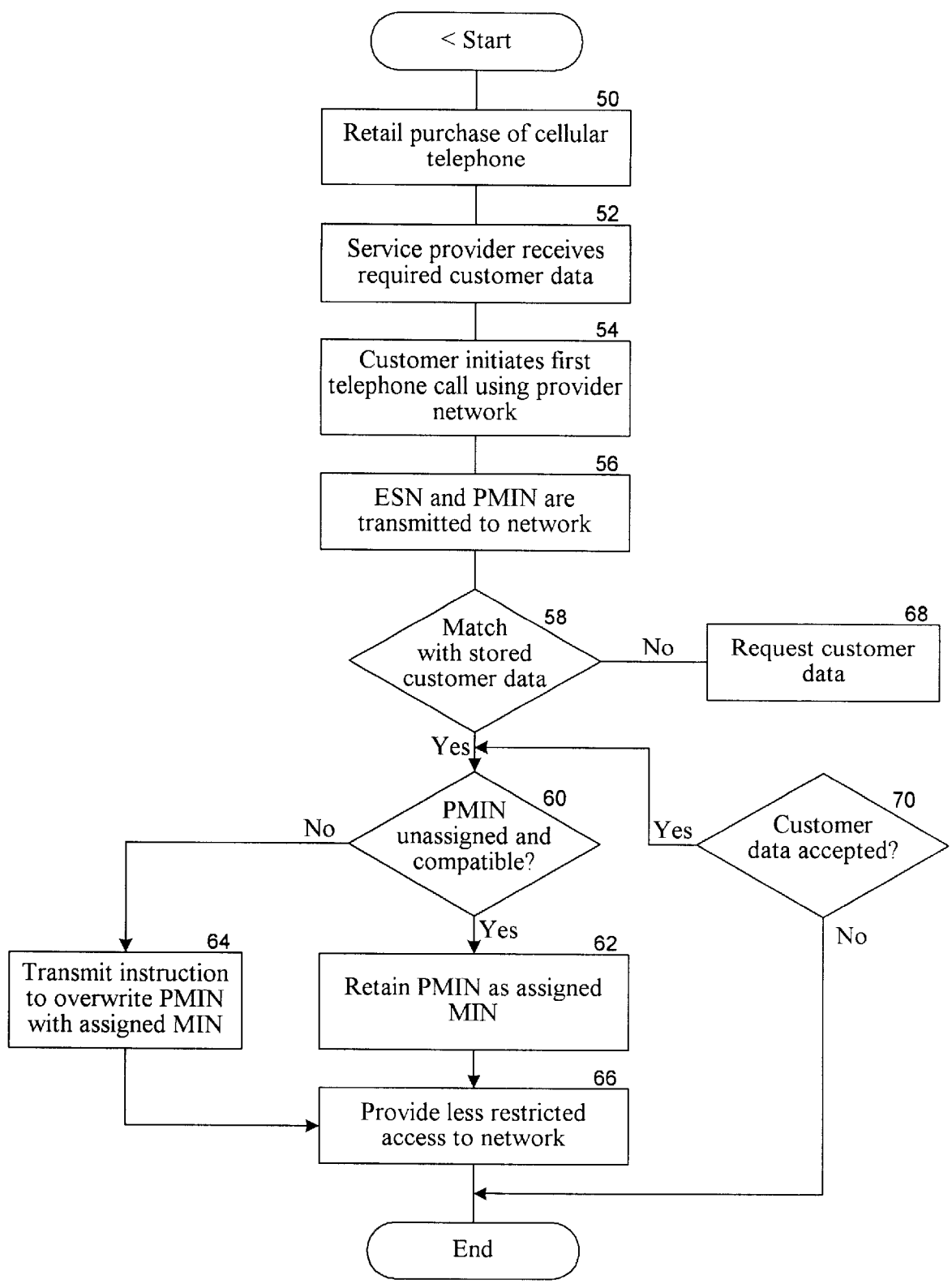
FIG. 2 is a flow chart depicting a method of evaluating a mobile communication terminal device such as the device depicted in FIG. 1 for less restricted access in accordance with the present invention.

With reference now to FIG. 2, there is shown a flow chart depicting a process of providing a mobile communication terminal device having a preliminary identifier with less restricted access to a selected provider's cellular network upon verification in accordance with an illustrative embodiment of the present invention. Upon the sale of a device such as device 10 to a consumer (block 50), the retailer notifies the selected cellular service provider of the purchaser's identity, credit information—if required by the provider at this time, as well as the ESN and preliminary MSID of the unit sold (block 52). Alternatively, the consumer may be requested to provide this information at the initial programming session, not at the point of sale.

The user seeks to utilize the cellular network for the first time by depressing the mode switch key (block 54). In response to the call signal, the ESN is sent to a base station as data together with the PMSID (Preliminary Mobile Station Identification) discussed above (block 56). In accordance with the illustrative embodiment of FIG. 2, the transmitted data is received at the base station and evaluated to determine whether coincidence is attained or not between the combination of the ESN and the PMSID and a previously registered corresponding combination (decision block 58). If so, the process proceeds from decision block 58 to decision block 60 for a determination of whether the PMSID and/or any other preliminary identifying information is compatible with the selected provider's network. If the PMSID or other preliminary identifying information is compatible with the selected provider's network, it may be retained (block 62). Otherwise an instruction is transmitted by the network provider to overwrite the PMSID data with an appropriate MSID newly assigned to the unit (block 64). Service authorization codes may, for example, be received from the service provider central computer (not shown) as channel tone signals that may be converted to authorization codes for storage in the memory of the telephone.

Regardless of the decision reached at block 60, less restricted access to the selected provider's network is now obtained by the new service customer (block 66). That is, the new customer is now able to complete a telephone call to a desired party using the cellular network of the service provider. If, however, no coincidence is discerned between the combination of the ESN and PMSID and previously stored customer data at block 58, the prospective consumer may be asked to provide information either by a live agent or by an automated voice prompt system (block 68) which may be accepted or rejected by the service provider network (block 70). In this regard, it should be noted that even if the ESN and PMSID do correspond to the stored customer data, it may be desirable to request certain information from the prospective consumer, for comparison to the stored customer data, to verify the caller's identity before passing operation of the process to block 60.

It should, of course, be noted that while the present invention has been described in reference to illustrative embodiments, other arrangements may be apparent to those of ordinary skill in the art. For example, while the disclosed embodiments utilize discrete devices, these devices can be implemented using one or more appropriately programmed processors, special-purpose integrated circuits, digital processors, or an analog or hybrid counterpart of any of these devices.

What is claimed is:

1. A method of controlling access by a wireless terminal to a wireless link available from a communications service provider, said method comprising:

receiving from a wireless terminal an identifier transmitted, at least in part, on the wireless link, wherein the identifier includes first and second numbers, the first number including a serial number that is permanently associated with the wireless terminal;

analyzing the identifier to determine whether the second number transmitted by the wireless terminal is a preliminary identifier, the preliminary identifier providing the wireless terminal restricted access to the wireless link, and if the second number is a preliminary identifier, analyzing a customer data record using the first and second numbers to determine whether the wireless terminal should continue to have restricted access to the wireless link; and transmitting, upon favorable completion of said analyzing step, a signal to the wireless terminal so that the wireless terminal transmits a replacement identifier the next time the wireless terminal transmits an identifier, the replacement identifier allowing the wireless terminal to have less restricted access to the wireless link than the preliminary identifier.

2. The method of claim 1, wherein the preliminary identifier received during said receiving step includes first and second numbers that together are essentially unique to die wireless terminal.

3. The method of claim 1, wherein the wireless terminal is a cellular terminal and one of the first aid second numbers is in mobile identification number (MIN) format.

4. The method of claim 1, wherein the analyzing step further comprises transmitting a signal representative of a query to the wireless terminal at least in part on a wireless link, the query requesting data.

5. The method of claim 4, wherein the analyzing step further comprises comparing data received from said wireless terminal after the query with data in a customer data record associated with the preliminary identifier.

6. The method of claim 1, wherein the signal transmitted during the transmitting step represents the replacement identifier.

7. The method of claim 6, wherein the signal transmitted during the transmitting step also represents an instruction to overwrite the preliminary identifier with the replacement identifier.

8. The method of claim 1, wherein the preliminary identifier is associated with a customer data record available to the wireless communication network.

9. The method of claim 8, further comprising the steps of:

transmitting a query requesting data from the wireless terminal; and comparing data received from the wireless terminal to the customer data record.

10. The method of claim 1, wherein the step of transmitting the signal to the wireless terminal further includes the step of instructing the wireless terminal to overwrite the preliminary identifier with the replacement identifier.

* * * * *

UNITED STATES PATENT AND TRADEMARK OFFICE
CERTIFICATE OF CORRECTION

PATENT NO.    : 6,490,445 B1
DATED         : December 3, 2002
INVENTOR(S)   : David William James Holmes It is certified that error appears in the above-identified patent and that said Letters Patent is hereby corrected as shown below:

Column 1,
Line 40, delete hyphen between "includes" and "some";

Column 2,
Line 6, delete "the inconvenience of" between "only" and "unit";

Column 4,
Line 34, insert -- of the present invention -- after "use";
Line 43, delete "is" between "attempt" and "to";

Column 6,
Line 34, "die" should be -- the --;
Line 37, "aid" should be -- and --.

Signed and Sealed this

Thirteenth Day of May, 2003

JAMES E. ROGAN
*Director of the United States Patent and Trademark Office*